July 27, 1965 C. F. KOHLER 3,197,741

MEANS FOR RECORDING REGISTERED DATA

Filed Sept. 17, 1959 7 Sheets-Sheet 1

INVENTOR.

Charles F. Kohler

BY

Harness, Dickey & Pierce.

ATTORNEYS.

July 27, 1965 C. F. KOHLER 3,197,741

MEANS FOR RECORDING REGISTERED DATA

Filed Sept. 17, 1959 7 Sheets-Sheet 2

INVENTOR.
Charles F. Kohler
BY
Harness, Dickey & Pierce.
ATTORNEYS.

July 27, 1965 C. F. KOHLER 3,197,741

MEANS FOR RECORDING REGISTERED DATA

Filed Sept. 17, 1959 7 Sheets-Sheet 3

INVENTOR.

Charles F. Kohler

BY

Harness, Dickey & Pierce

ATTORNEYS.

MEANS FOR RECORDING REGISTERED DATA

Filed Sept. 17, 1959 7 Sheets-Sheet 4

INVENTOR.
Charles F. Kohler
BY
Harness, Dickey & Pierce
ATTORNEYS.

MEANS FOR RECORDING REGISTERED DATA

Filed Sept. 17, 1959 7 Sheets-Sheet 5

INVENTOR.
Charles F. Kohler
BY
Harness, Dickey & Pierce
ATTORNEYS.

July 27, 1965 C. F. KOHLER 3,197,741

MEANS FOR RECORDING REGISTERED DATA

Filed Sept. 17, 1959 7 Sheets-Sheet 6

INVENTOR.

Charles F. Kohler

BY

Harness, Dickey & Pierce

ATTORNEYS.

July 27, 1965 C. F. KOHLER 3,197,741

MEANS FOR RECORDING REGISTERED DATA

Filed Sept. 17, 1959 7 Sheets-Sheet 7

INVENTOR.
Charles F. Kohler

BY
Harness, Dickey & Pierce
ATTORNEYS.

United States Patent Office 3,197,741 Patented July 27, 1965

3,197,741
MEANS FOR RECORDING REGISTERED DATA

Charles F. Kohler, Parma, Mich., assignor, by mesne assignments, to Hancock Telecontrol Corporation, Jackson, Mich., a corporation of Ohio Filed Sept. 17, 1959, Ser. No. 840,574
21 Claims. (Cl. 340—172.5)

This invention relates to systems for recording precoded and registered data, and more particularly to means for transferring such information from a plurality of groups of data accumulators in rapid succession.

It is an object of the invention to provide a novel and improved readout system of this type in which accumulated data may be instantaneously transmitted to recording equipment without requiring simultaneous resetting of the registers, and in which the data in a succeeding group of registers may be recorded while the first group is being reset.

It is another object to provide an improved readout system of this type which is especially adapted for use with a large number of sets of registers only some of which may be activated at the time of readout, and in which the recording equipment will be successively connected only to the activated groups in an extremely rapid fashion without delays caused by inactivated register groups interspersed among those activated.

It is also an object to provide a recording system of this character which is adapted for use in an industrial establishment in which each register group is associated with a particular machine in the plant, and which permits individual data recording for each worker in a serial production group for which only one set of registers is used.

It is another object to provide an improved recording system of this nature which is adapted for either manual or automatic operation, and in which inadvertent interruption of the recording of each group is prevented.

It is a further object to provide a novel readout mechanism having the above characteristics, in which the registering of data is automatically suspended during the recording interval and is reinstituted thereafter, thus insuring proper data transmittal.

It is another object to provide an improved readout system of this character which is versatile in nature and is adapted for use in conjunction with various types of recording equipment as well as with different combinations of precoded and registered data.

Other objects and features of novelty of the invention will be specifically pointed out or otherwise become apparent when referring, for a better understanding of the invention, to the following description taken in conjunction with the accompanying drawings wherein.

Figure 1:
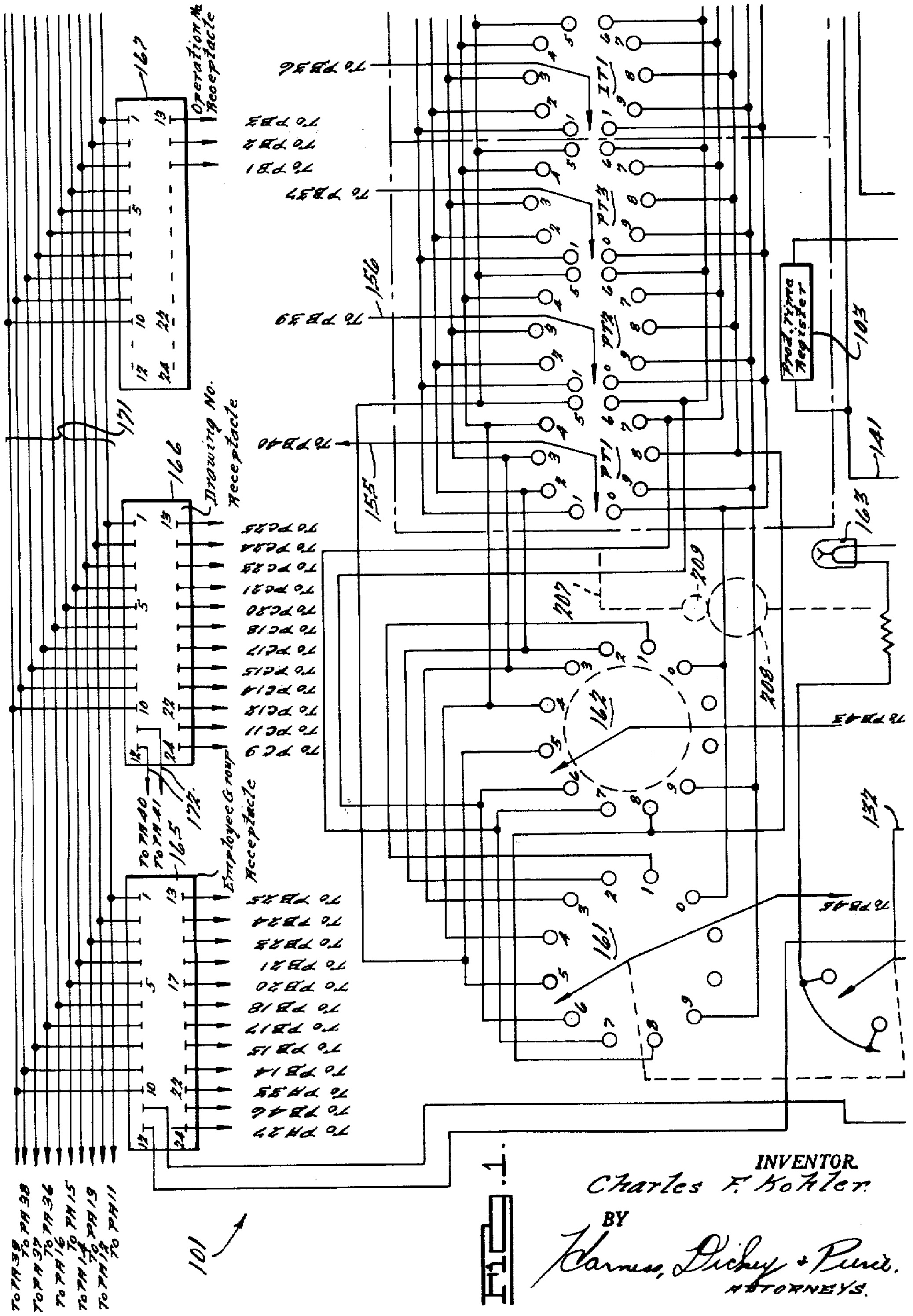
FIGURE 1 is a portion of an electrical circuit diagram showing the components of a master indicator set having precoded and registered data accumulating means and incorporating the principles of the invention.

In general terms, the invention comprises a system by means of which precoded and registered information of a digital nature may be periodically transmitted from storage components to a recording machine wherein the information may be recorded in the form of punched cards, printed columns or in other ways. The illustrated embodiment of the invention is in a form especially adapted for use in a production control system such as that illustrated and described in copending application Serial No. 586,788, filed May 23, 1956 by Charles F. Kohler and B. H. McCurdy and assigned to the assignee of the present application, now Patent No. 2,985,368 dated May 23, 1961. It will be understood however that the system could also be used in other environments.

As shown, the invention is used in conjunction with a plurality of indicator sets or panels at a central station, those called master panels being each associated with a particular machine in a plant, while group panels are subordinate to particular master panels which are each connected to a single machine in an assembly line having several workers. The master panels are adapted to receive precoded data relating to the employee, operation and pay rate, and to accumulate data such as productive time, authorized idle time and parts production. The group panels are adapted to receive precoded data relating to the identity and pay scale of each individual worker in the group.

A lockout relay is provided in each master panel which is deenergized upon closure of a control switch to permit accumulation of data from the machine. Readout, or transmittal of information to the recording apparatus, may be instituted for each master panel either individually or on an automatic sequential basis such as at the end of each shift. A readout enabling relay and a readout completion relay are provided for each master panel, and initiation of the cycle for an individual panel causes energization of the readout enabling relay which in turn connects the data storage means in that panel to the recording apparatus by energization of one or more readout relays, the invention as illustrated not requiring resetting of the registers in order that the data be transmitted. During this time, the registers are disconnected from their corresponding machine in the plant by energization of the readout relay which energizes the lockout relay so that further data may not be accumulated during the readout interval. If automatic sequential readout of all activated panels is desired, the readout enabling relays of all activated panels will be simultaneously energized at the beginning of the readout cycle, while those of inactive panels will remain deenergized.

As the readout portion of a panel cycle is completed, the readout completion relay is energized which deenergizes the readout enabling relay. This will permit readout to be immediately initiated in the next panel having a readout enabling relay which had previously been energized as described above, the inactive panels being bypassed without delay by virtue of the fact that their readout enabling relays are in deenergized positions. Energization of the readout completion relay also causes operation of a reset motor for the registers in that panel and energization of a reset relay which deenergizes the readout completion relay but maintains the locked-out condition of the registers until their resetting has been completed. After the registers have been reset to their zero positions, the reset relay is de-energized, de-energizing the lockout relay and reconnecting the registers to the machine.

Should a master panel be provided with one or more group panels, means are provided for separately recording the precoded and registered data for each individual worker in the group. For example, if punched card recording is used, a first punched card will be produced corresponding to the master panel itself with proper indication on the card that it represents a group rather than an individual employee. After this card has been prepared, additional cards are prepared carrying the identical data as the master card with additional data relating to the individual employee identification and pay rate. For this purpose, the group panel is provided with a readout enabling relay and a readout completion relay corresponding to each employee in the group. The readout enabling relays which have employee plugs inserted in their corresponding receptacles in the group panel are energized simultaneously with the master panel readout enabling relay, and after the master card is completed, the informatioin for each of these employees, together with the master panel information, will be connected to the recording apparatus. A reset motor cut-out relay is also provided in the group panel and is energized at the same time as the readout enabling relays to prevent resetting of the master panel registers until all the group panel readout enabling relays have been de-energized. Completion of the group panel recording will also permit readout to begin in the next master panel at the central station.

Various interlock arrangements are provided in accordance with the invention for insuring proper sequencing of readout among the various panels. Some of these have been mentioned above and include the interlocking circuit for automatic sequential readout in banks of master and group panels and the circuit arrangement between a master panel and the group panels with which it is associated for repeating master panel information on each group panel card and preventing premature resetting of the master panel registers. An interlocking circuit is also provided among the manually operable switches provided for the master panels when it is desired to readout or record data from an individual panel at irregular intervals. This last-mentioned interlocking means will prevent successive recording of panel information in a direction opposite to that which is used for the automatic sequential recording, and as will be later seen, prevents interruption of readout for an individual panel which might otherwise occur.

Figure 2:
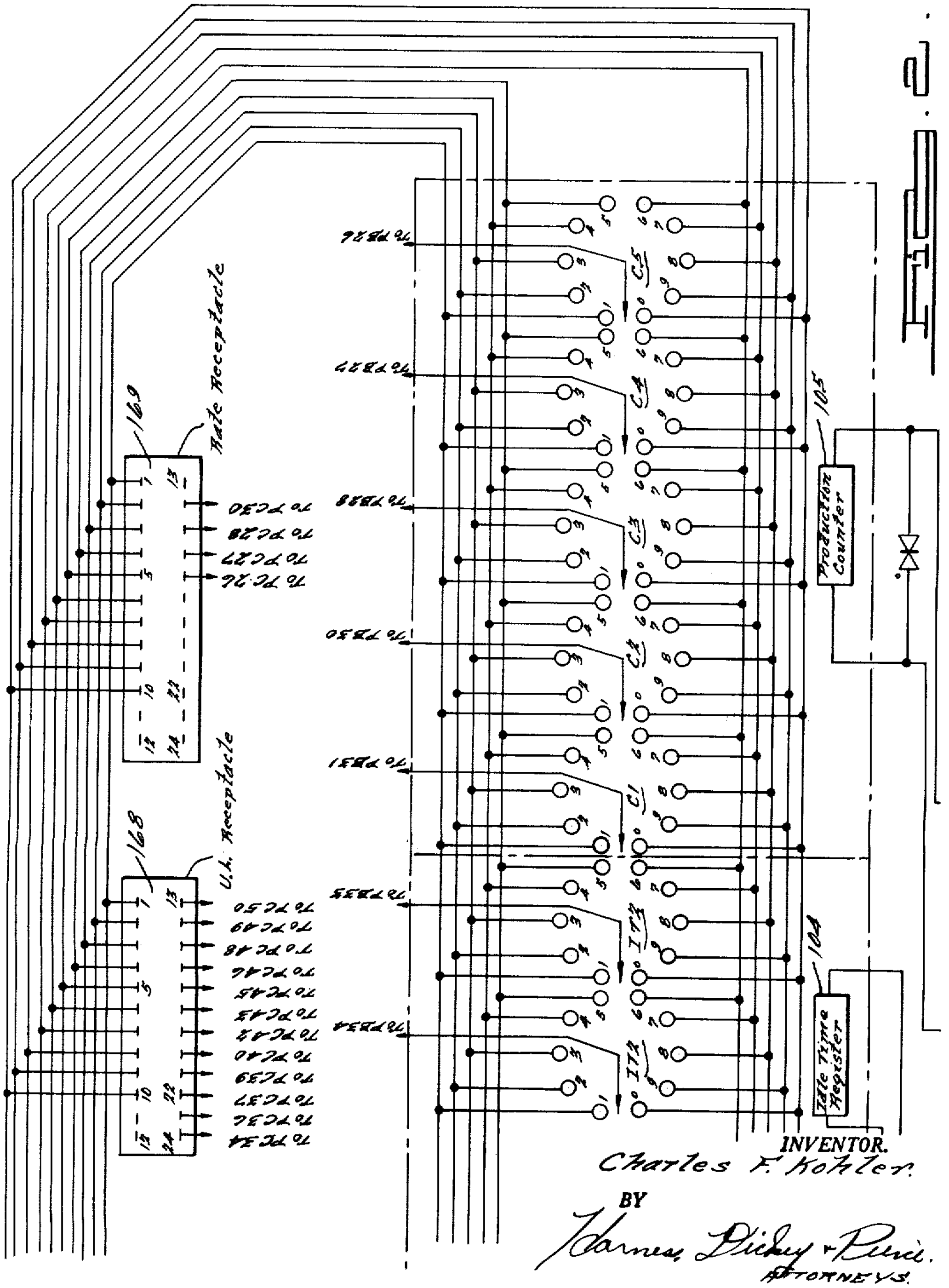
FIGURE 2 is another portion of the circuit of FIGURE 1 to be placed to the right of FIGURE 1 and aligned therewith.
Figure 3:
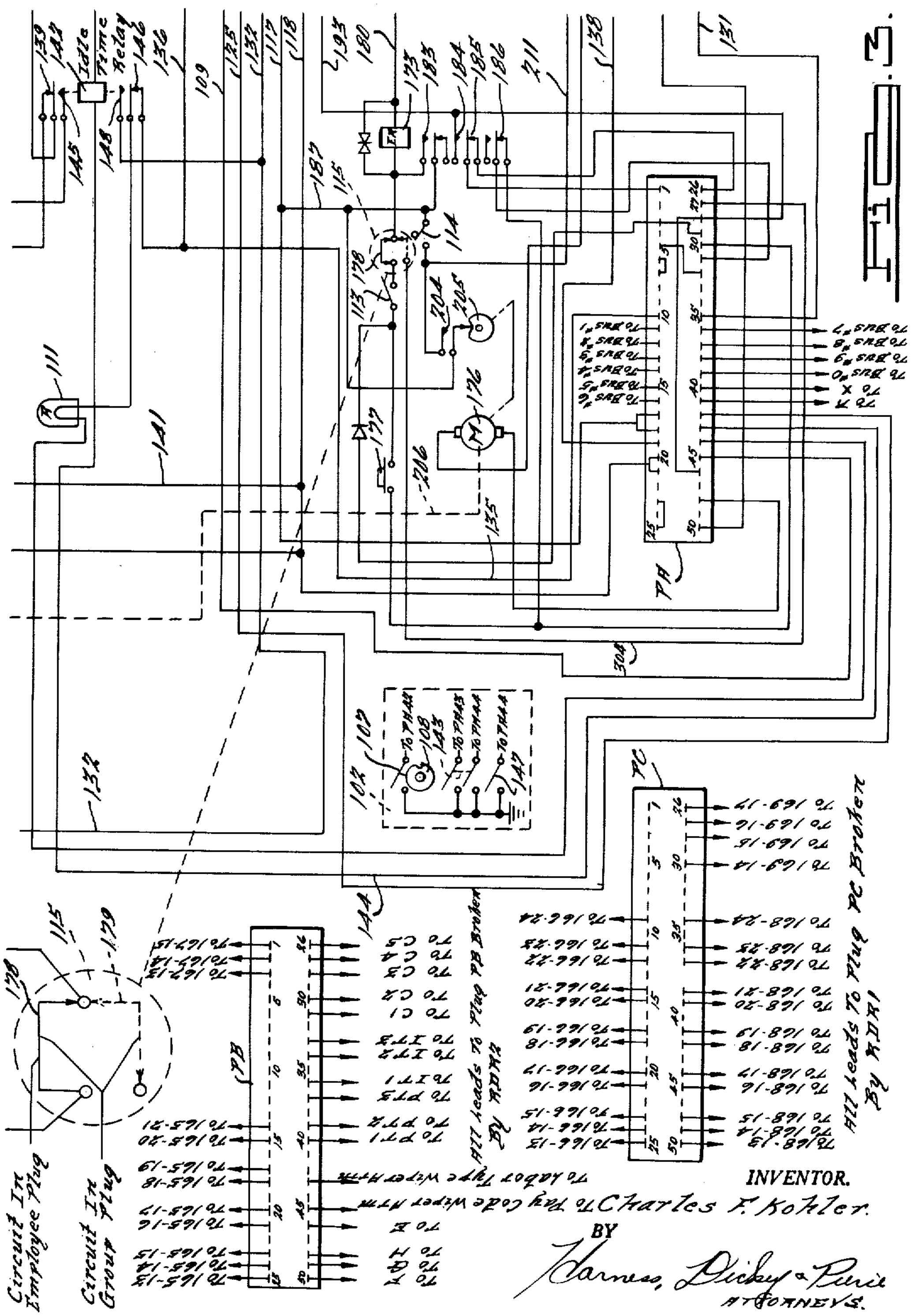
FIGURE 3 is another portion of the diagram of FIGURE 1 showing the relays, switches and reset motor associated with a master indicator set, to be placed below and aligned with FIGURE 1.
Figure 4:
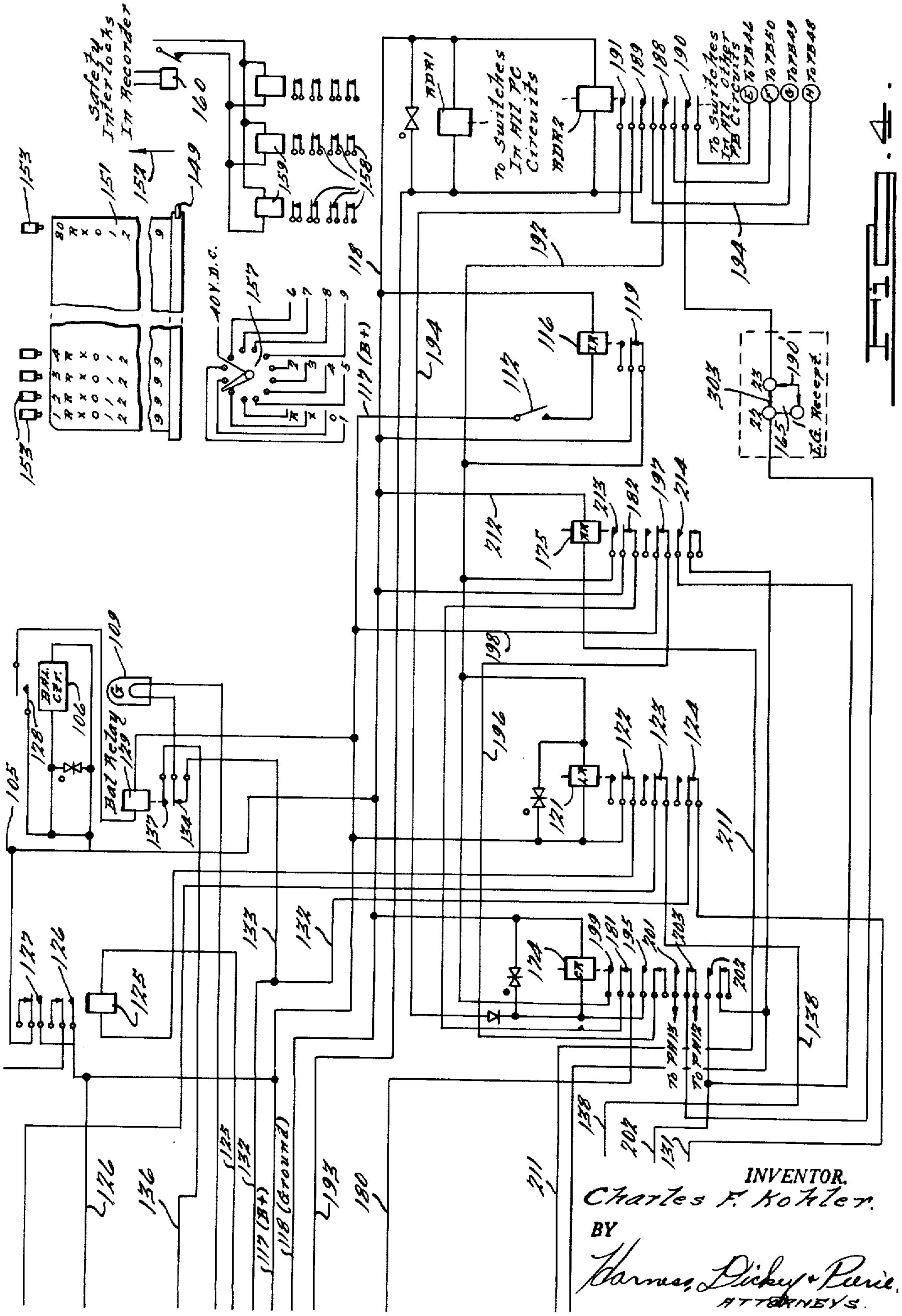
FIGURE 4 is still another portion of the diagram of FIGURE 1 to be placed below FIGURE 2 and to the right of FIGURE 3.

Referring more particularly to the drawings, FIGURES 1 to 4 show a partially schematic circuit diagram for a master panel or indicator set generally indicated at 101 (FIGURE 1) which may be one of a plurality of such panels arranged in banks at a central station in an industrial establishment. Each master panel 101 is associated with an individual machine in the plant schematically illustrated at 102 in FIGURE 3 and has a productive time register 103 (FIGURE 1) an idle time register 104, (FIGURE 2), a production counter 105 (FIGURE 2) and a balance counter 106 (FIGURE 4). These registers and counters may be of a conventional wheeled type, the productive time register being adapted to accumulate normal time for which the employee is to be paid at a full rate, the idle time register accumulating authorized idle time, for example, during a machine breakdown. The production counter is adapted to register units of production such as may be signaled, for example, by periodic closure of a switch 107 (FIGURE 3) at machine 102 operated by a cam 108 connected to the machine. Balance counter 106 may be preset to read the quota for a particular production run and will register zero when this run is completed. A first lamp 109 (FIGURE 4), for example green, is provided on the panel for indicating assignment of an operator to the machine, and a second lamp 111 (FIGURE 3), which may be red, to indicate that help is needed or the running of authorized idle time.

The arrangement and operation of the above-mentioned master panel components are described more specifically in the above-mentioned copending application, but it is believed that a brief review of this operation is desirable for a full understanding of the present invention. When an employee is assigned to machine 102, a manually operated assignment control switch 112 (FIGURE 4) on panel 101 is closed, closure of this switch simultaneously closing a readout enabling switch 113 (FIGURE 3). A reset motor switch 114 (FIGURE 3) may be controlled by the same handle that controls switches 112 and 113, switch 114 being closed only when switches 112 and 113 are open but being open when these switches are closed. At the same time, a jumper 178 (FIGURE 3) is placed in series with switch 113. This jumper is carried by an employee identification plug 115 inserted in a receptacle 165 (FIGURE 4) to be described later. The jumper and switch 113 are used during the readout cycle but are not involved in connecting master panel 101 with machine 102, switch 112 accomplishing this purpose. Switch 113 and plug 178 are here mentioned only because they are operated at the same time as switch 112.

Closure of switch 112 will energize an intermediate relay 116 (FIGURE 4), hereinafter referred to as IR, which is connected between a wire 117 and a wire 118. Wire 117 is connected to terminals numbered 17 and 18 of a terminal plug A, hereinafter referred to as PA (FIGURE 3). This plug is carried by the indicator set or panel 101 and is insertable in a corresponding receptacle RA (FIGURE 7) carried by the cabinet at the central station which supports panel 101. RA is described further with respect to FIGURE 7, but it may be here mentioned that it supplies terminals 17 and 18 of PA with a steady 48 volt D.C. These terminals will be hereafter referred to as PA17 and 18. Wire 118 is connected to PA20 and 21 which in turn is connected to ground.

Energization of IR will open a switch 119 and will thereby de-energize a lockout relay 121 (FIGURE 4) hereinafter referred to as LR connected between wires 117 and 118. De-energization of LR will permit closure of switches 122, 123 and 124. Closure of switch 122 will connect a production relay 125 (FIGURE 4) with wire 117 and in series with machine-operated switch 107 through PA42, thus permitting energization of relay 125 each time machine 102 cycles. Energization of production relay 125 will cause actuation of production counter 105 and balance counter 106 by means of switches 126 and 127 respectively. When balance counter 106 reaches zero, it is adapted to close a switch 128 which energizes a balance relay 129, shifting lamp 109 from steady illumination (PA35, wire 131, switch 124, wires 132 and 133, balance relay switch 134, lamp 109, and PA45 to ground) to blinking illumination (PA10, wires 135 and 136, balance relay switch 137, lamp 109, PA45) to indicate the completion of a production run.

Closure of switch 123 will permit a time pulse applied to PA19 and wire 138 to be connected through a switch 139 (FIGURE 3) to productive time register 103, the ground return being through wires 141 and 118. Switch 139 is controlled by an idle time relay 142, energization of which may be initiated by an idle time switch 143 located at machine 102 and connected to relay 142 through PA43 and wire 144. Closure of switch 143 will open switch 139 and close a switch 145, thus connecting the time pulse to idle time register 104 and disenabling register 103. Lamp 111 is connected to an intermittent voltage terminal PA10 by a normally closed switch 146 and wire 135, and a help switch 147 (FIGURE 3) is operable by the employee at the machine to close this blinking illumination circuit when help is needed. Key operated switch 143 which energizes relay 142 also grounds the circuit for lamp 111, but relay 142 will open switch 146 and close a switch 148 connecting lamp 111 to wire 132 which in turn is connected to steady supply terminal PA35.

In accordance with the invention, data storage means are associated with registers 103 and 104 and counter 105. In the illustrated embodiment, this means takes the form of a rotary switch associated with each wheel of each register, the switch having positions corresponding to the digits displayed by the wheel. Assuming, for example, that the productive and idle time registers each have three wheels and the production counter five wheels, these units will have switches designated PT1 to PT3, IT1 to IT3, and C1 to C5 (FIGURES 1 and 2). The rotary arm of each switch will be engageable with any of ten circumferentially spaced contacts, the arm itself leading to an element of the recording apparatus. For purposes of illustration, a recorder of the type manufactured by the International Business Machines Corporation is described. Such a machine has a carriage 149 (FIGURE 4) for a punch card 151 which it may advance by moving in the direction of arrow 152. The card has a series of vertical rows numbered one through eighty in each of which appear twelve digits, designated R, X and 0 through 9. A plurality of eighty punch solenoids 153 are provided extending transversely to the direction of card movement and when readout occurs, each of these solenoids is connected to a particular storage element. For example, wire 155 leading from PT1 may be connected through PB40 to the solenoid 153 above card column 47, wire 156 from PT2 through PB39 to solenoid 153 above card column 48, etc. These connections are completed by switches controlled by readout relays RDR1 and RDR2 as later described.

A summary punch emitter 157 is incorporated in the recording apparatus and is adapted to impart twelve successive current pulses to the storage elements as card 151 is advanced from its R position to its 9 position, the current pulses being synchronized with the intermittent stop positions of the carriage. At each position, only those solenoids 153 will be energized which have their circuits completed by their corresponding storage elements. For example, should the rotary contact for PT1 be in position 2, its solenoid 153 will be energized when digit 2 in column 47 is beneath it. The contacts of emitter 157 are connected to the storage element contacts through twelve switches 158 held closed by safety interlock relays 159 and leading to PA11–16 and PA36–41. Relays 159 are adapted to be deenergized by means such as a relay 160 in response to a recorder stoppage during readout so that the registered data will be preserved. This is accomplished particularly by the disconnection of the 9 bus from its normal connection to a register resetting means to be later described.

In addition to the rotary switches described above, various additional data storage elements of a precoded nature are provided in panel 101. These include a manually settable rotary "pay code" switch 161 and a "labor type" switch 162 (FIGURE 1). A third lamp 163, for example yellow, may be provided for illumination in conjunction with specific settings of switch 161 to warn that certain other information storage elements should be inserted. Also illustrated are an employee group receptacle 165, a drawing number receptacle 166, an operation number receptacle 167, an undetermined labor receptacle 168, and a rate receptacle 169 (FIGURES 1 and 2). Each of these receptacles is adapted to receive a plug having appropriate cross-connections among the various receptacle terminals so that proper information will be fed to the recording apparatus. Incidentally, certain connections in employee-group receptacle 165 are shown in FIGURE 4 for purposes of clarity. Each of the counter rotary switches, switches 161 and 162, and receptacles 165 to 169 has ten connections to the ten lines 171 leading from the 0 to 9 contacts of pulse emitter 157, and receptacle 166 additionally has wires 172 connected to the R and X contacts of the pulse emitter. As stated previously, the output lines from the register switches, switches 161 and 162, and receptacles 165 to 169 lead to individual solenoids 153 through switches controlled by RDR1 and RDR2 (FIGURE 4). Most of the switches controlled by these readout relays are not shown in the drawings.

Aside from the readout relays, the main components of the readout system in each master panel 101 comprise a readout enabling relay 173 (FIGURE 3), a readout completion relay 174 (FIGURE 4), a reset relay 175 and a reset motor 176. For purposes of convenience, relays 173, 174 and 175 will be designated ER, CR and RR respectively whereas relay 121 will be designated LR. A list of relay symbols and their descriptions is furnished below. The purpose of ER is to arm the circuits of RDR1 and RDR2 in response to closure of switch 113, insertion of employee plug 115, and completion of the ER circuit by manual or automatic means as described below. CR serves to deenergize ER after the information has been transferred from the storage means to the recording apparatus, return of ER to its deenergized position permitting energization of RDR1 and RDR2 in the next panel which has a previously energized ER. Energization of CR also serves to close the circuit of reset motor 176 (FIGURE 3). RR is energized in response to initiation of motor rotation and serves to hold the motor circuit closed while CR is deenergized and also holds LR energized continuing the disconnection between machine 102 and panel 101.

The remaining components of the readout system may perhaps best be understood by a description of the readout operation for panel 101. For this purpose, it will be assumed that readout for the single master panel is manually initiated, automatic sequential readout of a bank of panels being described with respect to FIGURE 7. A push-button switch 177 (FIGURE 3) is provided in series with ER, employee plug jumper 178, switch 113 and terminal PA30 to which B+ is supplied. It should be stated that when panel 101 is used as a master panel for an individual employee without any group employees, plug 115 will consist of the connection 178 seen in FIGURE 3 without the connection 179, the latter being present when an employee group plug is used. (The purpose of jumper 179 is to provide an impluse through PA27 which will energize relays in group panel below panel 101, which relays correspond in function to ER as described below.) The circuit for ER will be completed through wire 180, switch 181 of CR and switch 182 of RR to ground wire 118.

Figure 6:
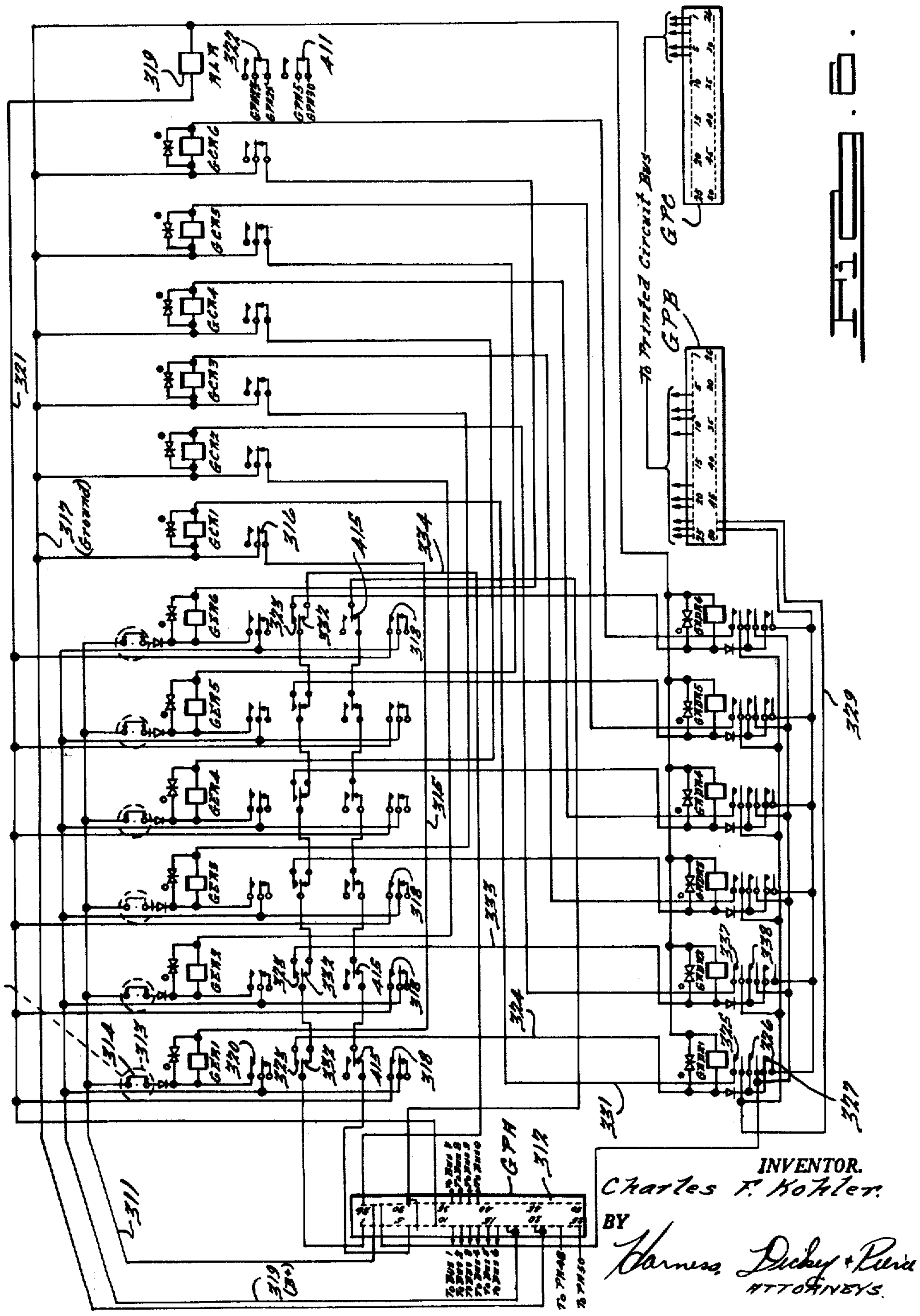
FIGURE 6 is another portion of the group panel circuit of FIGURE 5 showing the relay and switch components, to be placed below FIGURE 5.
Figure 7:
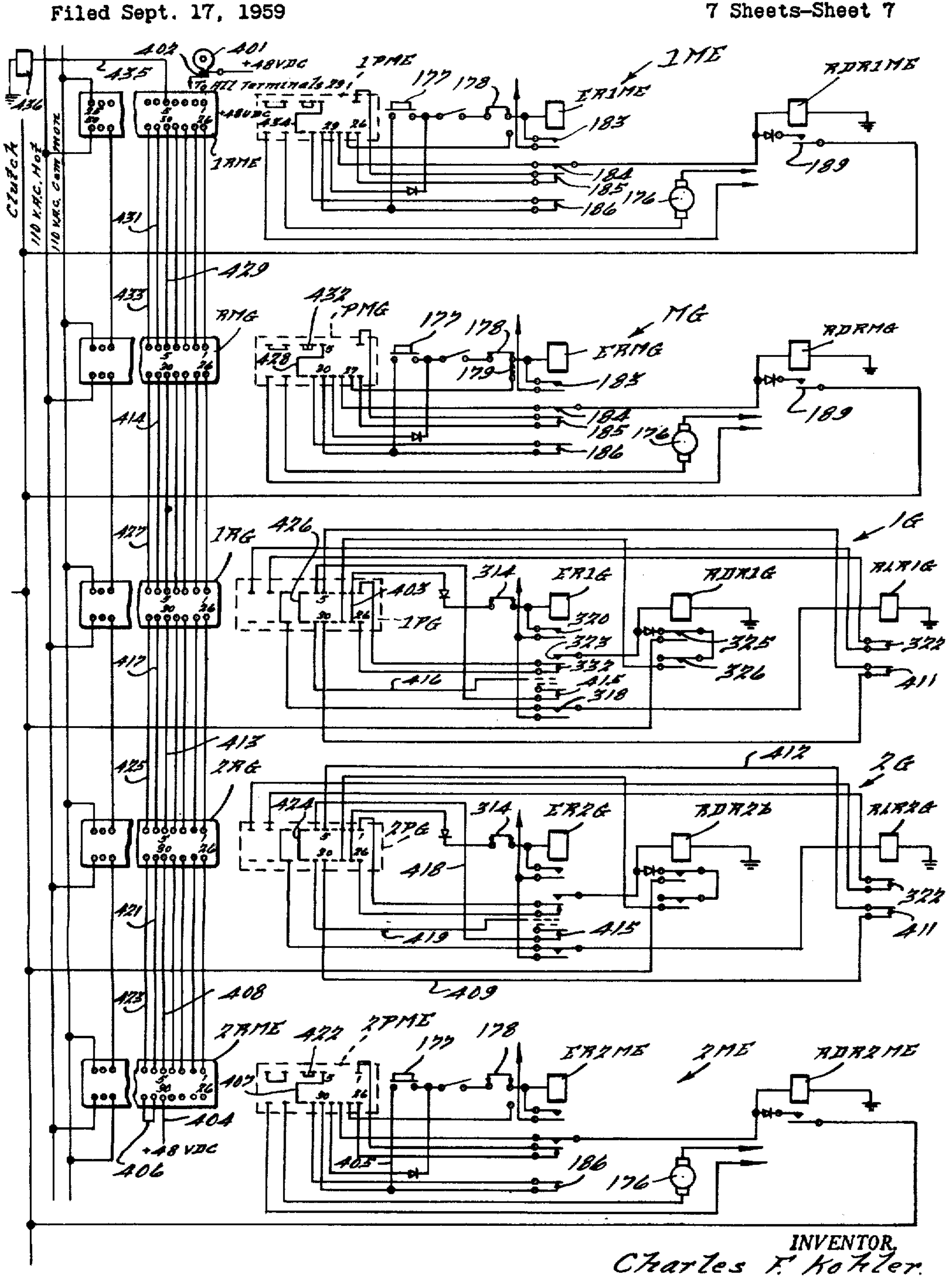
FIGURE 7 is a portion of a circuit diagram showing the interconnections between several master panels and a group panel and illustrating interlocking features of the invention.

Energization of ER will cause closure of switches 183 and 184 and opening of switches 185 and 186, the last-mentioned switch controlling interlocking circuits described with respect to FIGURE 7. Closure of switch 183 will complete a locking circuit for ER through wire 187 leading from wire 117. Closure of switch 184, which may be termed a readout switch, will connect terminal PA1 to RDR1 and RDR2, these relays being connected to ground wire 118. Voltage is supplied through terminal PA1 if the ER relays of the preceding panels in the bank are deenergized, as explained in greater detail with respect to FIGURE 7. Closure of switch 184 will also supply voltage to terminals PA28 and PA46. A remote relay (not shown) may be connected to terminal PA46 for feeding precoded information concerning the plant machine number and plant section number to the recording apparatus, it being understood that any particular panel 101 at the central station could be associated with a particular machine in the plant by such means as a patch-cord system. Terminal PA28 involves a group panel to be discussed later with respect to FIGURES 5 and 6.

Energization of RDR1 and RDR2 will close the switches leading from the various storage elements to punch solenoids 153 as described above. These relays will also close switches 188, 189, 190 and 191 shown in FIGURE 4. Closure of switch 188 will connect grounded terminal PB50 to LR by wire 192, the other side of this relay being connected to B+ wire 117. Energization of LR will cause opening of switches 122, 123 and 124, thus disconnecting machine 102 and the time pulse circuit from registers 103, 104 and 105 and halting further accumulation of data on these registers. Closure of switch 189 will complete a circuit from terminal PA1 through switch 184, wire 193 and terminal PB49 which is connected to the recorder starting or clutch circuit (not shown). This will initiate operation of the recording apparatus, that is, pulse emitter 157 and carriage 149 will begin to operate. A connection 190′ exists between terminals 1 and 23 of employee-group receptacle 165, as indicated in the lower right-hand portion of FIGURE 4. Closure of switch 190 will thus cause one of the punch solenoids 153 to punch the digit 1 in a particular card column, the connection being from switch 190 through terminal PB46. This will indicate that the particular punched card is for an individual employee at a machine connected to a master panel without group panels. Closure of switch 191 will arm a circuit leading from the 9 bus of pulse emitter 157 (which is also connected to terminal PB48) to CR, so that this relay will be energized when readout has been completed.

Recording of the stored information will thus be initiated, and will continue as punched card 151 is stepped in the direction of arrow 152 and pulse emitter 157 transmits pulses through the twelve buses to the various storage elements which will thus cause selective actuation of punch solenoids 153. It should be noted that in the illustrated embodiment of the invention a "broadside" transmittal of stored information will occur, that is, the completion of a punched card will involve only twelve steps of the carriage even though many more than twelve digits of information are being recorded. This arrangement will save considerable time during each punched card cycle compared to that which would be required if the digits of all the storage elements were recorded sequentially.

When the 9 bus of the emitter 157 is energized, current will flow through terminal PB48, switch 191 and wire 194 to CR, energizing this relay. A locking circuit for CR will be closed from wire 118 through CR, contact 195, wire 196, contact 197 of RR and wire 198 to wire 117. Energization of CR will also close switches 199, 201 and 202 and open switches 181 and 203.

Opening of switch 181 will deenergize ER. This will cause opening of switch 184 and deenergization of RDR1 and RDR2, thus disconnecting the storage elements from their corresponding punch solenoids 153. Switch 188 will also open, but LR will be held in its energized position by switch 199 of CR and RR switch 182 so that the panel registers will still be disconnected from machine 102. Deenergization of ER will also close switch 185 which may be termed a signal transmitting switch, thus permitting B+ to be fed from terminal PA1 to terminal PA26 which is connected to terminal PA1 of the panel next below. Should this next panel have an energized relay ER, the B+ will energize the readout relays in that panel; if the relay ER in the next panel is deenergized, the B+ will instantaneously travel to succeeding panels until it reaches one in which the relay ER is energized, and the readout relays of that panel will be energized. This interlocking circuit is described in further detail below with respect to FIGURE 7. Deenergization of ER will also close switch 186 which is in the push-button interlock circuit, the function of which is also described below.

Switches 201 and 203 in CR control punch solenoids 153 which identify cards pertaining to employee groups rather than individual employees, and will be discussed later with respect to FIGURES 5 and 6. Closure of switch 202 will close the circuit of reset motor 176, 110 volts being applied across terminals PA48 and PA50. As soon as the reset motor starts its rotation, it will close a switch 204 controlled by a cam 205 on the reset motor shaft. Reset motor shaft 206 is connected to a register reset shaft 207 by gears 208, 209, the ratio of these gears being such that one revolution of shaft 206 will produce two revolutions of shaft 207, insuring complete resetting of all of the registers. It should be kept in mind that when the register wheels and the rotary switches are reset to their zero position, their connection with punch solenoids 153 will have already been broken. It should also be observed that while register resetting is taking place in panel 101, readout of succeeding panels may continue without interruption.

Closure of switch 204 will cause energization of RR in a circuit leading from B+ wire 117, wire 187, switch 204, wire 211, RR and wire 212 to ground wire 118. Energization of RR will cause opening of switches 182 and 197, and closing of switches 213 and 214. Opening of switch 197 will break the circuit to CR, deenergizing this relay. This will cause switches 195, 199 and 202 to open and switch 181 to close. Closure of switch 181 will have no effect on ER since this circuit will have previously been broken by opening of push-button switch 177 and switch 182 of RR. Opening of switches 182 or 199 will not be followed by deenergization of LR, since switch 213 of RR will hold LR in its energized position, thus continuing the disconnection between panel 101 and machine 102. Closure of switch 214 will maintain the circuit for reset motor 176 despite the opening of switch 202.

After motor 176 has completed one revolution, switch 204 will open, deenergizing RR. This will cause opening of switch 213, deenergizing LR and reconnecting panel 101 to machine 102 so that further accumulation of data may be initiated. It will be observed that the readout system components in panel 101 will then be in their original position so that another readout cycle may be started whenever desired. Switch 114 is provided for resetting the registers at times when it is not desired to transfer their information to the recording apparatus. Closure of switch 114 will close the circuit of reset motor 176 through wires 117, 187, 211 and 212 which will energize RR. This will close switch 214 in the reset motor circuit but will not effect the other portions of the readout system.

Figure 5:
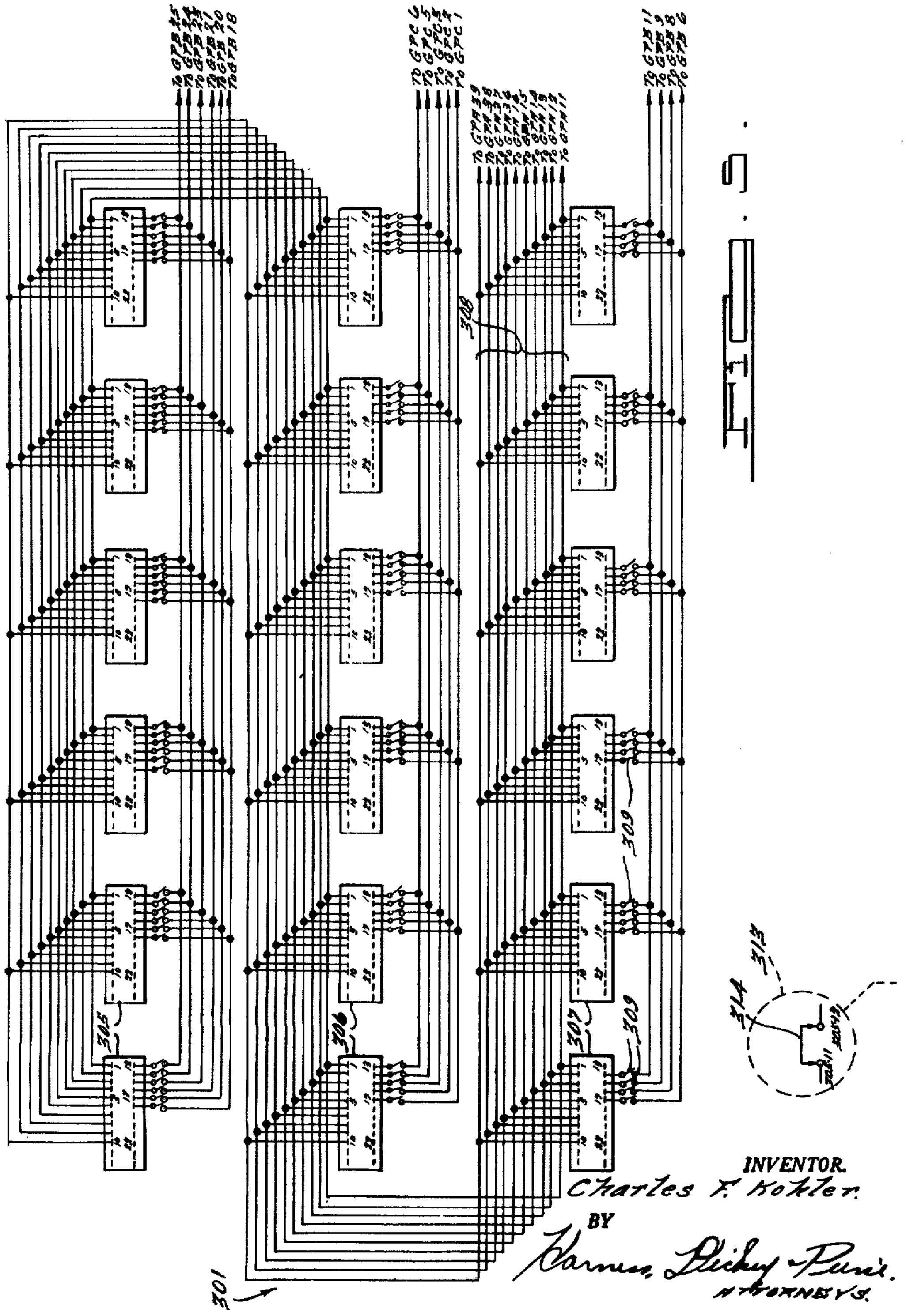
FIGURE 5 is a portion of a circuit diagram showing the precoded data components of an employee group panel of the type which may be associated with a master indicator set when several employees are in an assembly line or in serial production.

FIGURES 5 and 6 illustrate a group panel generally indicated at 301 which may be associated with a master panel 101 when several employees work on an assembly line or in serial production. As illustrated, panel 301 can accommodate up to six employees whose productive time, idle time and parts production are being accumulated by the associated master panel 101. In general terms, panel 301 has means for carrying precoded data with respect to each employee in the group, and an ER relay and CR relay are provided for each employee, these relays having the same general functions as those in the master panel. When a master panel has a group panel associated with it, the employee group receptacle 165 of the master panel does not carry connection 190′ but does carry a connection 303 shown in FIGURE 4, and plug 115 carries connections 178 and 179. Connection 303 serves to pass the impulse from emitter bus 2 through PA12, switches 203 and 190, and PB46 which is connected to the same punch solenoid 153 used to punch the numeral 1 when a non-group card is being prepared. This will cause the numeral 2 to be punched instead of 1 in the same card column, indicating that the master panel card pertains to a group rather than to an individual employee. Connection 179 as mentioned previously serves to transmit the current from the ER circuit of the master panel through a wire 304 to terminal PA27 of the master panel which is connected to terminal GPA2 of a plug GPA (FIGURE 6) in the group panel. As before, this plugs is insertable in a receptacle GRA (FIGURE 7) carried by the cabinet which receives the master and group panels.

Group panel 301 has six employee receptacles 305, (FIGURE 5) six receptacles 306 for carrying precoded data relating to the participating pay rate of each employee, and six receptacles 307 relating to a differential pay rate. Each of these receptacles is connected to the ten emitter buses of the recording apparatus, these being indicated at 308. The output connections of the receptacles are controlled by switches 309, and readout relays GRDR1 through GRDR6 (FIGURE 6) are provided for each employee and control the receptacle output switches 309 of that employee.

A wire 311 leads from terminal GPA2 to terminals 11 of all receptacles 305, and contacts 11 and 12 of each employee receptacle 305 are adapted to be connected by an employee plug, a portion of which is indicated at 313. When so connected, the GER relay associated with that plug will be energized since it is connected to terminal 305–12. For example, if employee data is applied to the first or left hand set of receptacles illustrated in FIGURE 5, relay GER (FIGURE 6) will be energized by a circuit leading from wire 311, connection 314, wire 315 and switch 316 of deenergized relay GCR1 (FIGURE 6) to a wire 317 which is connected to ground through terminal GPA21. Thus, when ER of the master panel is energized, all the relays GER1, GER2 which have plugs in their employee receptacles 305 will be simultaneously energized. A hold switch 320 is provided for each GER relay.

Means are provided for preventing energization of reset motor 176 when a master panel card for a group has been completed and the cards for the individual employees in the group are being prepared. This means includes a switch 318 closed by energization of any GER relay in any group panel below a master panel, and a reset lockout relay RLR (FIGURE 6) which is energized by closure of any switch 318. This relay circuit is from GPA17, 18 which are connected to B+ through wire 319, any switch 318, wire 321, RLR and wire 317. A switch 322 is opened by energization of RLR, this switch being in the supply circuit of motor 176 by means of terminals GPA23 and GPA25 and terminals PA48 and PA50.

A complete operational cycle of recording information from a master panel and an associated group panel may now be described. When ER of the master panel is initially energized, and assuming that information for six employees is carried by the group panel, relays GER1 through GER6 of the group panel will be energized at the same time as ER. RLR will also be energized, opening the reset motor circuit. A master panel punched card will be prepared in the manner described above with respect to FIGURES 1 through 4, it being recalled that this card will be punched in an appropriate column at a two digit instead of a one digit to indicate that it is a master card for a group rather than an individual employee. When the 9 pulse of emitter 157 is reached, CR of the master panel will be energized, deenergizing ER. This will temporarily deenergize relays RDR1 and RDR2 of the master panel. Reset motor 176 will not be started by energization of CR because of the open condition of RLR switch 322. The CR circuit will remain closed through switches 195 and 197. Deenergization of ER will close switch 185, permitting B+ to flow from terminal PA1 of the master panel to terminal PA26, and from there to terminal GPA1. Because of the closed condition of switch 323 of GER1, current will flow through wire 324 to GRDR1 and from there to ground wire 317. Energization of GRDR1 will close switches 325 and 326 as well as the fifteen additional switches 309 for the receptacles 305, 306 and 307 of employee 1. Closure of switches 309 will feed the precoded information to the recording apparatus in the same manner as described above with respect to FIGURES 1 through 4. Closure of switch 326 will cause B+ to be fed to terminals GPA3 and GPA28 which are connected to terminal PA28 of the master panel. The B+ will continue through wire 193 to relays RDR1 and RDR2 of the master panel, maintaining these relays in their energized condition. Thus, the recorder clutch circuit will remain closed and another punched card will be produced carrying all the information transmitted through the switches of RDR1 and RDR2 plus GRDR1. In order to insure that the recorder clutch circuit is not momentarily opened during the time it takes for RDR1 and RDR2 to be reactivated, a switch 327 is provided for each GRDR relay, this switch closing the clutch circuit through GPB49 which is connected thereto and wire 324. It will be observed that a total of sixty-five columns will be punched for the group employee's card whereas fifty columns had been punched for the master card. The precoded group number carried by plug 115 in receptacle 165 will of course be the same for the master card and the employee cards of the group.

When the 9 pulse is emitted from emitter 157, it will pass through terminal GPB48 of a receptacle GPB associated with group panel 301, through a wire 329, switch 325, wire 331, relay GCR1 and from there to ground wire 317, energizing GCR1. This will open switch 316 and will cause deenergization of GER1. Deenergization of GER1 will cause opening of switch 323 and deenergization of GRDR1, disconnecting the first group of receptacles 305, 306 and 307 from the recording apparatus and deenergizing GCR1. A switch 332 will also be closed, permitting B+ to pass from GPA1 through the next switch 323 which is held closed by GER2 and from there through a wire 333 to GRDR2. Should GER2 be deenergized because no employee is assigned to the 2 position (and no jumper 314 present), the current will pass through a switch 332 to the readout relay of the next energized GER, such as GRDR3. Here again, it will be noted that no time will be lost in skipping over unassigned positions. It will be noted that even though GER1 is deenergized, the fact that there still remains at least one switch 318 which is closed, will maintain the energized condition of RLR, thus preventing reset motor operation. Energization of GRDR2 will close its switches 337 and 338 which serve functions similar to the previous switches 325 and 326, and will also close the fifteen other switches 309 for the second employee in the group. A second punched card will thus be prepared carrying all the information of the master panel plus the information relating to the second employee.

This process will continue until six punched cards have been produced in addition to the master punch card. When the last GER relay is deenergized, the last switch 318 holding RLR energized will be opened, and switch 322 will be closed, permitting energization of reset motor 176 of the master panel. This will cause energization of RR and deenergization of CR as described above with respect to the master panel. It will be noted that during the preparation of all employee group cards, LR will have remained in its energized condition because of the closed condition of CR switch 199 and that there would therefore have been no registration of data during the readout cycle.

At the same time that the master panel is being reset, B+ will pass through the last closed switch 332 and a wire 334 to terminal GPA 26 which is connected through its receptacle to terminal 1 of the panel receptacle next below, which may be a master panel (having a receptacle RA) or another group panel (having a receptacle GRA). It will be observed that if another group panel is connected below the one illustrated, it will have switches 318 similar to those seen in FIGURE 6 which will maintain RLR in its energized position, so that resetting of the master panel will not occur until cards for all the employees in the group panels associated with the master will have had punched cards prepared for them.

The following is a list of abbreviated symbols used in FIGURES 1 to 6 for reference purposes:

| Symbol (FIGURES 1 to 6): | Description |
|---|---|
| PA, PB, PC | Plugs in master panel. |
| RA, RB, RC | Receptacles in cabinet for PA, etc. |
| LR | Lockout relay in master panel. |

| | |
|---|---|
| ER | Readout enabling relay (master panel). |
| CR | Readout completion relay (master panel). |
| RDR1, RDR2 | Readout relays (master panel). |
| RR | Reset relay in master panel. |
| IR | Intermediate relay in master panel. |
| GER1, GER2, etc. | Readout enabling relays (group panel). |
| GCR1, GCR2, etc. | Readout completion relays (group panel). |
| RLR | Reset lockout relay in group panel. |
| GPA, GPB, GPC | Plugs in group panel. |
| GRA, GRB, GRC | Receptacles in cabinet for GPA, etc. |

FIGURE 7 shows an arrangement of five panels at a central station which illustrates some of the interlocking circuits mentioned above. The panels consist of a first master employee panel 1ME, a master group panel MG, a first group panel 1G, a second group panel 2G, and a second master employee panel 2ME. Associated with each panel is a plug having an appropriate symbol as listed below, and each plug is insertable in a receptacle carried by the cabinet. It may be stated that plug 1PME, or plug PMG, for example, corresponds to plug PA in FIGURE 3, whereas plug 1PG or 2PG corresponds to plug GPA in FIGURE 6. Readout enabling relays, readout relays and reset lockout relays are also designated by appropriate symbols in the various panels.

If all the activated panels are to be read out at predetermined time intervals, a timing cam 401 is provided which is adapted to close a switch 402 connecting a voltage supply to all the terminals 29 of the various receptacles. This would cause activation of ER–1ME, ER–MG and ER–2ME, bypassing push-buttons 177. Current would also pass through jumper 179 of panel MG, PMG–27, RMG–27, 1RG–2, 1PG–2 and jumper 314 to ER–1G which is typical of all the readout enabling relays in panel 1G. Moreover, the current will flow through a jumper 403 connecting 1PG–2 and 1PG–27, 1RG–27, 2RG–2 and 2PG–2 to energize ER–2G and the other readout enabling relays in panel 2G.

With a voltage supply connected to 1R–ME, closure of switch 184 of ER–1ME will energize RDR–1ME and begin the readout cycle of panel 1ME in the manner previously described. As ER–1ME is deenergized and switch 185 thereof closed, current will pass from 1RME–26 to RMG–1 and through the closed switch 184 of ER–MG to energize RDR–MG. Similarly, deenergization of ER–MG as recording of panel MG information is completed will cause energization of RDR–1G through switch 323 of ER–1G.

It will thus be seen that the current supply for the readout relays in each panel is fed from the top down as seen in FIGURE 7 through switches 185 and 332 of the previous panel, and that if a readout enabling relay of one of these previous panels were to be energized, this current would be interrupted. Such inadvertent energization of one of the readout enabling relays could occur by pressing of a push-button 177, and the current supply for these push-buttons is therefore such as to prevent this situation from occurring.

In essence, the current supply for push-buttons 177 is in a direction opposite that of the current flow for the readout relays. Assuming, for example, that panel 2ME is the last panel at the central station, terminal 2RME–30 is supplied with push-button current by a wire 404. This current is supplied through push-button 177 of panel 2ME by a wire 405, and is also connected to a switch 186 of ER–2ME. The other side of this switch is connected to 2PME–31, and a jumper 406 connects 2RME–31 and 2RME–32. Another jumper 407 connects 2PME–32 and 2PME–5, and a wire 408 connects 2RME–5 with 2RG–30. 2PG–30 is connected by a wire 409 with a switch 411 controlled by RLR–2G, the other side of this switch being connected by a wire 412 with 2PG–5. A wire 413 connects 2RG–5 with 1RG–30, 1PG–30 being connected through a switch 411 of RLR–1G to 1PG–5. Similarly, 1RG–5 is connected to RMG–30, PMG–30 being connected through switch 186 of ER–MG to PMG–31. RMG–31 is connected by a wire 414 to 1RG–6, 1PG–6 being connected to a switch 415 controlled by ER–1G. As is seen best in FIGURE 6, each readout enabling relay in a group panel is provided with a switch 415, these switches being connected in series and returning by a wire 416 to GPA–371 or 1PG–31 in FIGURE 7.

1RG–31 is connected by a wire 417 to 2RG–6, and 2PG–6 is connected by a wire 418 to another series of switches 415 in panel 2G. A wire 419 leads from these switches to 2PG–31, and a wire 421 leads from 2RG–31 to 2RME–6. A jumper 422 is provided between 2PME–6 and 2PME–7, and a wire 423 connects 2RME–7 to 2RG–32. A jumper 424 is provided between 2PG–32 and 2PG–7, and a wire 425 connects 2RG–7 with 1RG–32. A jumper 426 between 1PG–32 and 1PG–7 leads to a wire 427 connecting 1RG–7 with RMG–32. A jumper 428 connects PMG–32 and PMG–5, a wire 429 connecting RMG–5 with 1RME–30. 1PME–30 is connected with push-button 177 of 1ME and also through switch 186 of ER–1ME to 1PME–31. A wire 431 connects 1RME–31 with RMG–6, a jumper 432 being provided between PMG–6 and PMG–7. RMG–7 is connected by a wire 433 to 1RME–32, the latter being connected by a jumper 434 to 1RME–5. 1RME–5 is connected by a wire 435 to ground through a relay 436, assuming that panel 1ME is the first panel in the chain. Relay 436 may thus be used to control the recording machine by its energization after readout of all the panels has been completed.

To illustrate the use of the push-button interlocking circuit, let us first assume that it is desired to record the data of panel 1ME by pressing its push-button 177. It will be noted from the previous description that the power supply to 1PME–30, which is connected to push-button 177, passes through switch 186 of ER–2ME, switches 411 of RLR–2G and RLR–1G, switch 186 of ER–MG, switches 415 of ER–1G and in the other readout enabling relays in panel 1G, and switches 415 of ER–2G and the other readout enabling relays in panel 2G. Thus, the readout enabling relays of all the master and group panels below panel 1ME, as well as the reset lockout relays of the group panels, must be denergized in order for ER–1ME to be energized by its push-button 177. If any of the master or group panels below panel 1ME is being read out, this readout cannot be interrupted by depressing push-button 177 of panel 1ME.

Similarly, if it is desired to depress push-button 177 of panel MG effectively, ER-2ME as well as RLR–1G and RLR–2G must be deenergized. The presence of switches 411 in the push-button interlock circuit will prevent any difficulty should the push-button of a master group panel such as panel MG be depressed a second time before cards have been prepared for all the employees in the group.

It has thus been demonstrated that a panel cannot be read out by depression of a push-button if any panel below is being read out. It has of course already been shown that a panel below one which is being read out cannot be connected to the recording apparatus until readout has been completed in the first panel. For example, if panel 1ME is being read out and ER–1ME is still energized, depression of push-button 177 in panel MG would merely result in ER–MG being energized, but no current would be supplied to RMG–1, and therefore to RDR–MG, until ER–1ME is deenergized and its switch 185 closed.

A list of symbols used with respect to FIGURE 7 follows:

| Symbol (FIGURE 7) | Description |
|---|---|
| 1ME | First master employee panel. |
| MG | Master group panel. |
| 1G | First group panel. |
| 2G | Second group panel. |
| 2ME | Second master employee panel. |
| 1RME, RMG, 1RG, etc. | Receptacles for 1ME, MG, 1G, etc. |
| 1PME, PMG, 1PG, etc. | Plugs for 1ME, MG, 1G, etc. |
| ER–1ME, ER–MG, ER–1G, etc. | Readout enabling relays for 1ME, MG, 1G, etc. |
| RDR–1ME, RDR–MG, RDR–1G, etc. | Readout relays for 1ME, MG, 1G, etc. |
| RLR–1G, RLR–2G | Reset lockout relays for EG and 2G. |

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a system for recording registered data from a plurality of register groups, means responsive to actuation of said registers for storing information, means for connecting the information storage means of a first group of said plurality of groups to an information recording apparatus, and means coacting directly with said recording apparatus and responsive to completion of said recording for resetting the registers in said first group and simultaneously connecting the information storage means of a second group to said recording apparatus.

2. In a system for recording data collected in a series of groups of registers, data storage means connected to each group of registers, selective means for placing each group of registers in an active or inactive status, means for connecting the information storage means of a first active status group in said series to a recording apparatus, and means responsive to the completion of information transmission from said first group to said recording apparatus for instantaneously bypassing any inactive status groups between said first group and the next active status group and connecting said next active status group to said recording apparatus.

3. In a system for recording data collected in a series of data storage groups, selective means for placing each group in an active or inactive status, means for connecting the storage means of a first active status group in said series to a recording apparatus, and means responsive to the completion of information transmission from said first group to said recording apparatus for instantaneously connecting the next active status group in said series to said recording apparatus and simultaneously resetting the storage means of said first group.

4. In a system for recording data collected in a series of data storage groups, means for supplying information to said groups, selective means for placing each group in an active status capable of being connected to a recording apparatus or in an inactive status incapable of connection thereto, means for connecting a first active status group in said series to said recording apparatus for information transmission and simultaneously disconnecting said group from said information supply means, and means responsive to the completion of information transmission from said first group to said recording apparatus for instantaneously disconnecting the first group from the recording apparatus, connecting the next active status group in said series to said recording apparatus and initiating resetting of said first group.

5. The combination according to claim 4, further provided with means responsive to completion of said first group resetting for reconnecting said first group to said information supply means.

6. In a system for recording data collected in a series of data storage groups, normally inactivated recorder readout means for each group, signal means for activating said readout means, selectively operable readout enabling means for each group movable between a readout position in which the connection between said signal means and the readout means of that group is enabled and the connection between the signal means and all groups below is disenabled, and a signal transmission position in which the connection between the signal means and the readout means of that group is disenabled and the connection between the signal means and the group next below is enabled, and readout completion means for each group responsive to completion of information transmission from that group through its recorder readout means for moving its corresponding readout enabling means from its readout position to its signal transmission position.

7. In a system for sequentially recording information stored in a series of data storage groups, a readout relay associated with each group and movable to a readout position connecting said group to a recording apparatus, a readout enabling relay associated with each group, a signal source, selective means for placing the first readout enabling relay in said series in a first position connecting said signal source to the first readout relay for moving said readout relay to its readout position, or a second position making said signal unavailable at said first readout relay but available at the second readout enabling relay in said series, selective means for placing each succeeding readout enabling relay in either a first position connecting said signal to its corresponding readout relay or a second position making the signal available at the next succeeding readout enabling relay, and means responsive to completion of information recording in each group for returning its readout enabling relay from its first to its second position, whereby said signal will be instantaneously transmitted to the readout relay of the next group having a readout enabling relay in its first position.

8. In a system for registering data from a plurality of machines at a central station and sequentially recording said data, a series of register groups, means connecting each group to a machine for accumulating data on said registers pertaining to the machine, information storage means associated with said registers, means for connecting the storage means of a first group of registers to a recording apparatus and simultaneously disconnecting said first group of registers from its corresponding machine, and means responsive to completion of information transmission from said first register group to the recording apparatus for disconnecting a second group of registers from its machine, connecting the storage means of said second group of registers to said recording apparatus, resetting said first group of registers, and reconnecting said first group of registers to its machine.

9. In a system for registering data from a plurality of machines at a central station and sequentially recording said data, a series of register groups, precoded data storage means associated with each group, means connecting each group to a machine for accumulating data on said registers pertaining to the machine, information storage means associated with said registers, means for connecting the storage means of a first group of registers to a recording apparatus and simultaneously disconnecting said first group of registers from its corresponding machine, and means responsive to completion of information transmission from said first register group to the recording apparatus for instantaneously connecting the storage means of a second group of registers to said recording apparatus and reconnecting said first group of registers to its machine.

10. In a system for registering data from a plurality of machines at a central station and sequentially recording said data, a series of register groups, means connecting each group to a machine for accumulating data on said registers pertaining to the machine, information storage means associated with said registers, means for connecting the storage means of a first group of registers to a recording apparatus and simultaneously disconnecting said first group of registers from its corresponding machine, means responsive to completion of information transmission from said first register group to the recording apparatus for instantaneously connecting the storage means of a second group of registers to said recording apparatus and simultaneously resetting said first register group while maintaining the disconnection between the first register group and its corresponding machine, and means responsive to completion of the first register group resetting for reconnecting the first register group to its corresponding machine.

11. In a system for accumulating information pertaining to a machine on a register and recording such information, a register, information storage means associated with said register, means connecting said register to a machine, means for connecting said information storage means to a recording apparatus and simultaneously disconnecting said register from said machine, means responsive to completion of information transmission to said recording apparatus for resetting said register while maintaining the disconnection between said register and said machine, and means responsive to arrival of said register at its zero position for reconnecting the register to the machine.

12. In a system for accumulating information relating to a plurality of employees and intermittently recording such information, a series of registers having information storage means, means for selectively connecting each register to a source of information, a readout enabling relay, a readout relay, and a readout completion relay associated with each register, selective means for energizing any of said readout enabling relays when its corresponding register is connected to a source of information, a switch responsive to energization of the first readout enabling relay in said series for energizing the corresponding readout relay, means responsive to energization of said readout relay for disconnecting its corresponding information storage means from said source of information and transmitting the information to a recording apparatus, means responsive to completion of said information transmission for energizing the corresponding readout completion relay, means responsive to energization of said readout completion relay for deenergizing said readout enabling relay, and means responsive to deenergization of said readout enabling relay for causing energization of the readout relay correspoding to the next previously energized readout enabling relay in the series.

13. The combination according to claim 12, further provided with means responsive to deenergization of said first readout enabling relay for resetting its corresponding register, and means responsive to completion of said resetting fer connecting said register with its source of information.

14. In a system for accumulating information relating to a plurality of employees and intermittently recording such information, a series of registers having information storage means, means for selectively connecting each register to a source of information, a readout enabling relay, a readout relay, and a readout completion relay associated with each register, selective means for energizing any of said readout enabling relays when its corresponding register is connected to a source of information, a signal transmitting switch connected to each readout enabling relay, means connecting said signal transmitting switches in a series circuit when said readout enabling relays are deenergized, means responsive to energization of any readout enabling relay for opening its corresponding signal transmitting switch, a readout switch associated with each readout enabling relay closable by such energization for connecting one side of said series circuit to the corresponding readout relay, a signal source connected to one end of said one circuit side adjacent the first register in said series whereby said readout relay will be energized, means responsive to energization of said readout relay for disconnecting its corresponding information storage means from said source of information and transmitting the information to a recording apparatus, means responsive to completion of said information transmission for energizing the corresponding readout completion relay, and means responsive to energization of said readout completion relay for deenergizing said readout enabling relay.

15. The combination according to claim 14, further provided with precoded information storage means for each of a plurality of group employees associated with one of said registers, a group readout enabling relay and a group readout relay for each of said precoded storage means, a signal transmitting switch connected to each of said group readout enabling relays, means connecting said last-mentioned signal transmitting switches in series with said first-metioned signal transmitting switches when said group readout enabling relays are deenergized, a readout switch for each of said group readout enabling relays connected to its corresponding group readout relay, means responsive to energization of any of said group readout enabling relays for opening its signal transmitting switch and closing its readout switch, whereby the corresponding group readout relay may be energized, means responsive to energization of said group readout relay for transmitting information to said recording apparatus from its corresponding precoded storage means and from said register, and a group readout completion relay for each precoded storage means energizable in response to completion of said last-mentioned information transmission for deenergizing its corresponding group readout enabling relay.

16. The combination according to claim 15, further provided with resetting means for each of said registers, means normally responsive to energization of the corresponding readout completion relay for actuating said resetting means, and a reset lockout relay responsive to energization of any of said group readout enabling relays for preventing such actuation.

17. The combination according to claim 15, said selective means for energizing the readout enabling relays comprising a current supply circuit connected adjacent the last register in said series, an interlock switch controlled by each of said readout enabling relays and group readout enabling relays and in series with said supply circuit when the readout enabling relays and group readout enabling relays are deenergized, and a manually controllable connection between each readout enabling relay and the interlock switch which is next below it in the series, whereby energization of any readout enabling relay requires that all the readout enabling relays and group readout enabling relays below it in the series be deenergized.

18. The combination according to claim 14, said selective means for energizing the readout enabling relays comprising a current supply circuit, a periodically closable switch for activating said supply circuit, connections from said supply circuit to each of said readout enabling relays, and a manually controllable switch in each of said last-mentioned connections.

19. The combination according to claim 14, said selective means for energizing the readout enabling relays comprising a current supply circuit connected adjacent the last register in said series, an interlock switch controlled by each of said readout enabling relays and in series with said supply circuit when the readout enabling relays are deenergized, and a manually controllable connection between each readout enabling relay and the interlock switch which is next below it in the series, whereby energization of any readout enabling relay and the interlock switch which is next below it in the series, whereby energization of any readout enabling relay requires that all the readout enabling relays below it in the series be deenergized.

20. In a system for gathering and recording information, a series of information storage units, means for connecting each of said units to a recording apparatus, means responsive to the completion of information transmission in each unit for activating the connecting means of the next unit, signal transmission means in each unit for activating the connecting means in the preceding unit, said signal transmission means being movable between enabling and disenabling positions, and means responsive to the activation of said connecting means in each unit for moving its signal transmission means to its disenabling position and thus preventing activation of the connecting means in the preceding unit.

21. In a system for selectively registering data pertaining to an individual employee or a group of cooperating employees and recording such information, a register for storing information relating to an employee, means for storing precoded information relating to said employee and other cooperating employees, means for transmitting information collected by said register and said precoded information relating to the first employee to a recording apparatus, selectively operable means movable between an inoperative position and a group recording position, means responsive to movement of said selectively operable means to its group recording position for repeatedly recording said registered information in conjunction with the precoded information for each of the other cooperating employees when said first employee is a member of a group, means for resetting said register in response to completion of information recording for an individual employee, and means responsive to movement of said selectively operable means to its group recording position for delaying actuation of said resetting means until said registered information has been repeatedly recorded for all of said group employees.

References Cited by the Examiner

UNITED STATES PATENTS

| | | | |
|---|---|---|---|
| 1,927,556 | 9/33 | Nelson | 340—147 |
| 2,504,999 | 4/50 | McWhirter | 340—164 X |
| 2,522,453 | 9/50 | Keyes | 340—163 |
| 2,591,617 | 4/52 | Savino | 340—150 |
| 2,719,284 | 9/55 | Roberts et al. | 340—151 |
| 2,840,705 | 6/58 | Scully | 340—147 |
| 2,918,654 | 12/59 | Hillyer | 340—150 |
| 2,918,658 | 12/59 | Hoberg | 340—174 |
| 2,937,369 | 5/60 | Newbold et al. | 340—183 |
| 3,029,414 | 4/62 | Schrimpf | 340—172.5 |
| 3,099,512 | 7/63 | Kohler | 340—172.5 |

FOREIGN PATENTS

| | | |
|---|---|---|
| 713,631 | 8/54 | Great Britain. |
| 796,196 | 6/56 | Great Britain. |

MALCOLM A. MORRISON, *Primary Examiner.*

EVERETT R. REYNOLDS, IRVING L. SRAGOW, *Examiners.*